(12) United States Patent
Dogiamis et al.

(10) Patent No.: US 10,249,925 B2
(45) Date of Patent: Apr. 2, 2019

(54) DIELECTRIC WAVEGUIDE BUNDLE INCLUDING A SUPPORTING FEATURE FOR CONNECTING FIRST AND SECOND SERVER BOARDS

(71) Applicant: Intel Corporation, Santa Clara, CA (US)

(72) Inventors: Georgios C. Dogiamis, Chandler, AZ (US); Sasha N. Oster, Chandler, AZ (US); Telesphor Kamgaing, Chandler, AZ (US); Adel A. Elsherbini, Chandler, AZ (US); Johanna M. Swan, Scottsdale, AZ (US); Shawna M. Liff, Scottsdale, AZ (US); Aleksandar Aleksov, Chandler, AZ (US); Brandon M. Rawlings, Chandler, AZ (US); Richard J. Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,086

(22) Filed: Sep. 30, 2016

(65) Prior Publication Data

US 2018/0097269 A1 Apr. 5, 2018

(51) Int. Cl.
*H01P 3/12* (2006.01)
*H01P 3/14* (2006.01)
*H01P 11/00* (2006.01)
*G06F 1/18* (2006.01)
*H01P 3/16* (2006.01)

(52) U.S. Cl.
CPC .............. *H01P 3/122* (2013.01); *G06F 1/182* (2013.01); *H01P 3/14* (2013.01); *H01P 3/16* (2013.01); *H01P 11/006* (2013.01)

(58) Field of Classification Search
CPC .. H01P 3/121; H01P 3/122; H01P 3/14; H01P 11/001; H01P 11/002; H01P 11/006
USPC ....................................................... 333/1, 239
See application file for complete search history.

(56) References Cited

U.S. PATENT DOCUMENTS

| 5,353,365 | A | 10/1994 | Dumas et al. | |
|---|---|---|---|---|
| 5,889,449 | A * | 3/1999 | Fiedziuszko | H01P 1/203 333/239 |
| 2003/0095758 | A1 | 5/2003 | Morse et al. | |
| 2003/0137371 | A1 * | 7/2003 | Saitoh et al. | H01P 3/122 333/239 |
| 2010/0109817 | A1 * | 5/2010 | Kodama | H01P 3/12 333/239 |

(Continued)

FOREIGN PATENT DOCUMENTS

| JP | 2001244725 A | 9/2001 |
|---|---|---|
| WO | 2018063560 | 4/2018 |

OTHER PUBLICATIONS

"International Application Serial No. PCT/US2017/047299, International Search Report dated Nov. 28, 2017", 3 pgs.

(Continued)

*Primary Examiner* — Benny Lee
(74) *Attorney, Agent, or Firm* — Schwegman Lundberg & Woessner, P.A.

(57) ABSTRACT

An apparatus comprises a plurality of waveguides, wherein the waveguides include a dielectric material; an outer shell; and a supporting feature within the outer shell, wherein the waveguides are arranged separate from each other within the outer shell by the supporting feature.

22 Claims, 7 Drawing Sheets

(56) References Cited

U.S. PATENT DOCUMENTS

2011/0185968 A1     8/2011  Pei
2012/0306587 A1*   12/2012  Strid et al. ............... H01P 3/16
                                                          333/1
2014/0241693 A1     8/2014  Engel
2014/0285294 A1*    9/2014  Haroun et al. ........... H01P 3/16
                                                          333/256

OTHER PUBLICATIONS

"International Application Serial No. PCT/US2017/047299, Written Opinion dated Nov. 28, 2017", 7 pgs.

* cited by examiner

DIELECTRIC WAVEGUIDE BUNDLE INCLUDING A SUPPORTING FEATURE FOR CONNECTING FIRST AND SECOND SERVER BOARDS

TECHNICAL FIELD

Embodiments pertain to high speed interconnections in electronic systems, and more specifically to waveguides for implementing communication interfaces between electronic devices.

BACKGROUND

As more electronic devices become interconnected and users consume more data, the demand on server system performance continues to increase. More and more data is being stored in internet "clouds" remote from devices that use the data. Clouds are implemented using servers arranged in server clusters (sometimes referred to as server farms). The increased demand for performance and capacity has led server system designers to look for ways to increase data rates and increase the server interconnect distance in switching architectures while keeping power consumption and system cost manageable.

Within server systems and within high performance computing architectures there can be multiple levels of interconnect between electronic devices. These levels can include within blade interconnect, within rack interconnect, rack-to-rack interconnect and rack-to-switch interconnect. Shorter interconnect (e.g., within rack and some rack-to-rack) is traditionally implemented with electrical cables (e.g., Ethernet cables, co-axial cables, twin-axial cables, etc.) depending on the required data rate. For longer distances, optical cables are sometimes used because fiber optic solutions offer high bandwidth for longer interconnect distances.

However, as high performance architectures emerge (e.g., 100 Gigabit Ethernet), traditional electrical approaches to device interconnections that support the required data rates are becoming increasingly expensive and power hungry. For example, to extend the reach of an electrical cable or extend the bandwidth of an electrical cable, higher quality cables may need to be developed, or advanced techniques of one or more of equalization, modulation, and data correction may be employed which increases power of the system and adds latency to the communication link. For some desired data rates and interconnect distances, there is presently not a viable solution. Optical transmission over optical fiber offers a solution, but at a severe penalty in power and cost. The present inventors have recognized a need for improvements in the interconnection between electronic devices.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments sei forth in the claims encompass all available equivalents of those claims.

Traditional electrical cabling may not meet the emerging requirements for electronic systems such as server clusters. Fiber optics may meet the performance requirements, but may result in a solution that is too costly and power hungry. A waveguide can be used to propagate electromagnetic waves including electromagnetic waves having a wavelength in millimeters (mm) or micrometers (μm). A transceiver and an antenna (sometimes referred to as a waveguide launcher) can be used to send electromagnetic waves along the waveguide from the transmitting end. A transceiver at the receiving end can receive the propagated signals using a receiving end antenna (e.g., a patch antenna operatively coupled to the waveguide). Waveguides offer the bandwidth needed to meet the emerging requirements. However, a waveguide that only includes hollow metal tubing can be difficult to work with as such waveguides can be prone to buckling or kinking when trying to apply the waveguide to a physical connector or if the connection requires bending of the waveguide.

Figure 1:
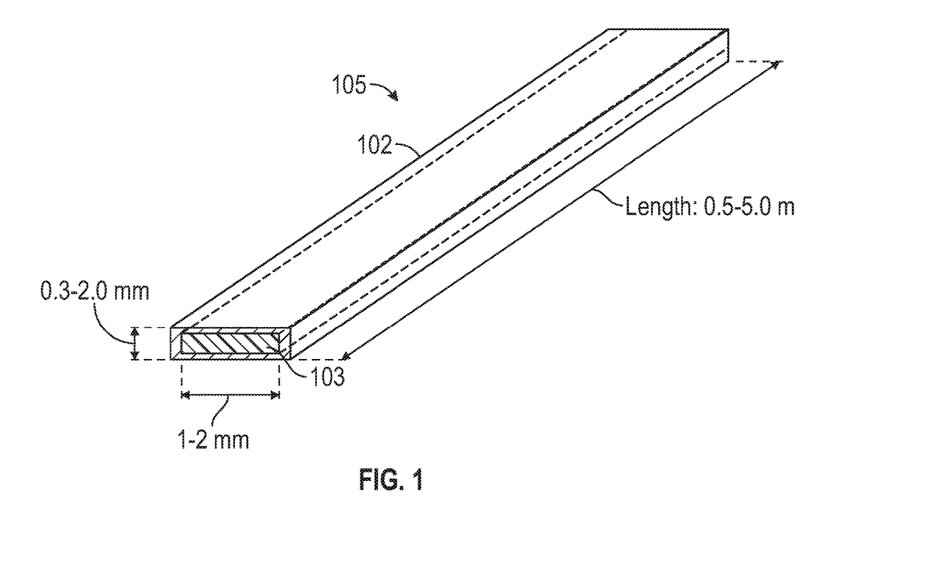
FIG. 1 is an illustration of a waveguide in accordance with some embodiments.

FIG. 1 is an illustration of an embodiment of a waveguide. In an example, the waveguide can have a height of 0.3-2.0 millimeters (0.3-2.0 mm), a width of 1-2 mm and a length of 0.5-5 meters (0.5-5 m). The waveguide 105 includes an outer layer 102 of conductive material such as metal. The inside of the waveguide, or waveguide core 103, includes a dielectric material. A waveguide that includes a conductive layer and a waveguide core of dielectric material can reduce signal loss (compared to an electrical cable such as a coaxial cable, twin-axial type or similar) and improve mechanical support of the waveguide.

Figure 2:
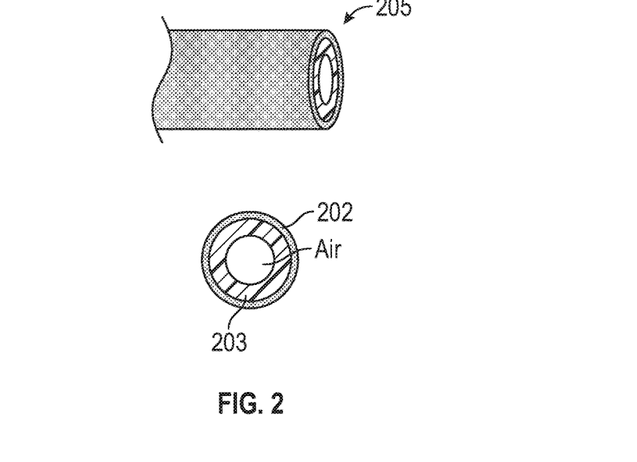
FIG. 2 is another illustration of portions of a waveguide in accordance with some embodiments.

FIG. 2 is an illustration of a portion of another embodiment of a waveguide. The waveguide 205 includes an elongate waveguide core 203 and an outer layer 202. The waveguide has a circular cross section, but the cross section may be elliptical, oval, square, rectangular or another more complex geometry. The waveguide may have a width or diameter of 0.3-2.0 mm and a length greater than one-half meter (0.5 m). In certain variations, the waveguide may have a diameter larger than 2 mm. In certain embodiments, the waveguide is dimensioned to carry signals having frequencies of 30 Gigahertz (GHz) to 300 GHz. In certain embodiments, the waveguide is dimensioned to carry signals having frequencies of 100 GHz to 900 GHz. The waveguide core includes a dielectric material such as one or more of polyethylene (PE), polytetrafluoroethylene (PTFE), perfluoroalkoxy alkanes (PFA), fluorinated ethylene propylene (FEP), polyvinylidene fluoride (PVDF), liquid crystal polymer (LCP), or ethylene-tetraflouroethylene (ETFE). The waveguide core may be formed as a continuous tube using an extrusion process. The dielectric waveguide core shown in FIG. 2 has a hollow center that is for example, filled with air, but the waveguide core may be solid without a hollow portion, or the waveguide core may include one or more hollow spaces that are not centered in the waveguide core.

The outer layer 202 is arranged around the waveguide core and the cross section of the outer layer may be concentric with the cross section of the waveguide core. The outer layer 202 can include a conductive material such as a metal (e.g., at least one of copper, gold, silver, or aluminum) or a conductive polymer (e.g., at least one of a polyaniline (PANT) or poly(3,4-ethylenedioxythiophene) polystyrene sulfonate (PEDOT:PSS)).

Figure 3:
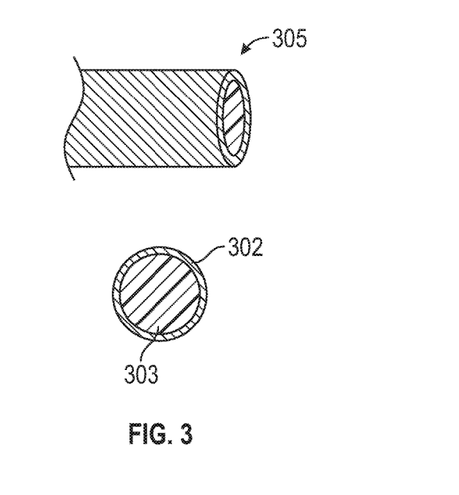
FIG. 3 is another illustration of portions of a waveguide in accordance with some embodiments.

FIG. 3 is an illustration of a portion of another embodiment of a waveguide. The waveguide 305 includes a waveguide core 303 and a waveguide outer layer 302 that is not conductive. The waveguide core includes a polymer having a low dielectric constant and the outer layer 302 can be a polymer shell. The waveguide core 303 can be a solid core of dielectric material as shown or the waveguide core can be dielectric material with a hollow center. In some embodiments, the waveguide 305 only includes the dielectric material with the low dielectric constant and does not include an outer layer.

A conductive outer layer of a waveguide confines the travelling electromagnetic wave to within the waveguide. Dielectric waveguides without a conductive layer need a specific separation distance in order to reduce crosstalk between neighboring waveguides, yet implementing system interconnections using waveguides bundled together may provide easier handling and installation compared to using only single waveguides.

Figure 4:
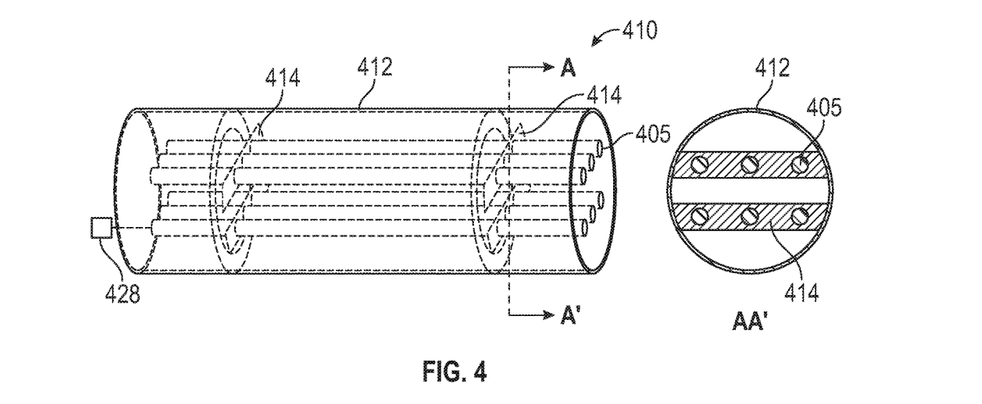
FIG. 4 is an illustration of portions of a waveguide bundle in accordance with soille embodiments.
Figure 6:
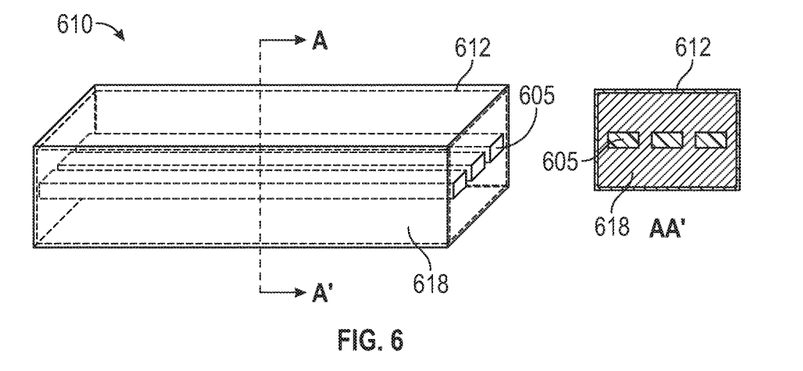
FIG. 6 is an illustration of portions of another waveguide bundle in accordance with some embodiments.
Figure 7:
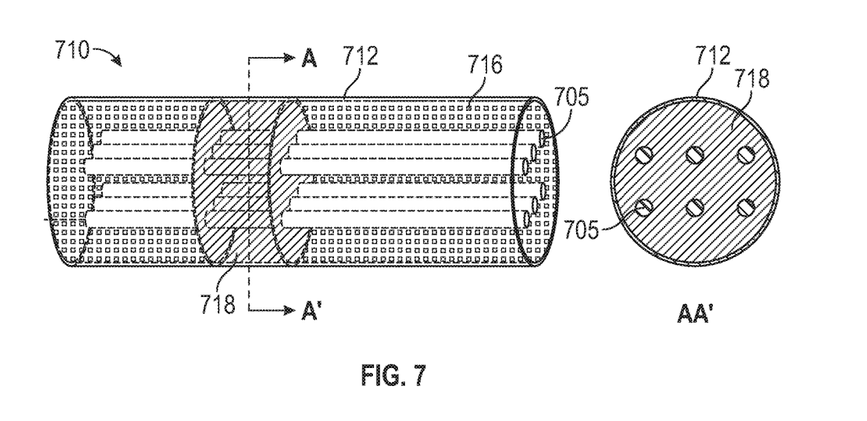
FIG. 7 is an illustration of portions of another waveguide bundle in accordance with some embodiments.

FIG. 4 is an illustration of multiple waveguides arranged in a waveguide bundle 410. In FIGS. 4, 6, and 7 the line segment AA' indicates the location of the cross section. The waveguides 405 include a dielectric material and may be dielectric waveguides that do not include a conductive layer. Each of the waveguides can be operatively coupled to a waveguide launcher 428 at each end of the waveguides to transmit and receive electromagnetic wave having frequencies greater than 100 Gigahertz. The waveguide bundle 410 includes an outer shell 412 or track to hold the waveguides. The outer shell 412 can include a conductive material. Electrical grounding of a conductive: outer shell can reduce electromagnetic: coupling between waveguide bundles in a server system. In some embodiments, the conductive material of the outer shell is metallic and can include one or more of copper, gold, silver, or aluminum. In some embodiments, the outer shell includes a conductive polymer.

The waveguide bundle 410 includes a supporting feature 414 arranged within the outer shell. The supporting feature supports or suspends the waveguides 405 within the outer shell and may separate the waveguides from each other by a specified separation distance to reduce crosstalk between waveguides within the waveguide bundle. The supporting feature 414 also positions the waveguides 405 away from the outer shell 412 to avoid contact between the waveguides and the outer shell. If the waveguides 405 include only dielectric material and do not have a conductive layer, the dielectric constant of the material of the supporting feature 414 should be lower than the dielectric constant of the material used in the waveguides 405. The supporting feature 414 can be very thin and flexible to support the waveguides somewhat like a string.

The supporting feature can be a solid structure. In the embodiment shown in FIG. 4, the supporting feature 414 includes multiple cross members arranged at two locations along the length of the outer shell 412. The actual number of locations where the cross members are arranged can depend on the overall length of the waveguide bundle 410. In certain embodiments, the cross members include plastic and the waveguides are arranged within the plastic cross members. The supporting feature can include a ring made of the same material as the cross members to hold the cross members in position within the outer shell 412. In the embodiment shown in FIG. 4, the space within the outer shell 412 between the waveguides 405 and between the waveguides 405 and the outer shell 412 is empty and can be air-filled.

Figure 5A:
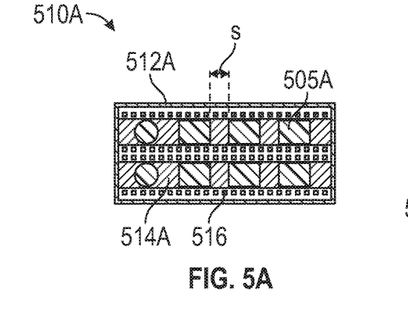
FIGS. 5A and 5B illustrate portions of more waveguide bundles in accordance with some embodiments.
Figure 5B:
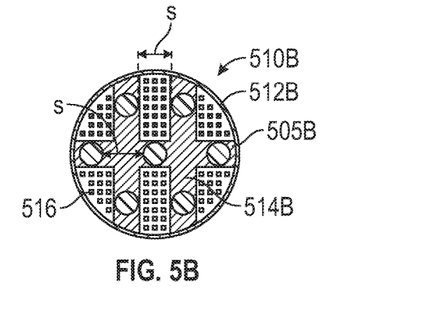

FIGS. 5A and 5B illustrate cross sections of two more embodiments of waveguide bundles. In waveguide bundle 510A of FIG. 5A, the cross section has a rectangular shape. The waveguides 505A are arranged within the outer shell 512A. FIG. 5A shows that the waveguides may have a circular or a rectangular cross section. The cross section also shows the supporting feature 514A for the waveguides. The supporting feature 514A is a solid structure that maintains a specified separation distance "S" between the waveguides 505A. For waveguide 510B of FIG. 5B, the cross section has a circular shape. The supporting feature 514B includes cross members arranged orthogonally to each other within the outer shell 512B to support the waveguides 505B. In FIGS. 5A and 5B, for the separation space S between the respective waveguides 505A and 505B and the corresponding outer shell 512A and 512B is shown filled with a filling material 516. The filling material 516 is arranged within the outer shell and is separate from the supporting feature. The filling material may have a lower dielectric constant than the dielectric material of the waveguides. In some embodiments, the filling material includes at least one of foam granules or foam powder.

FIG. 6 is an illustration of another embodiment of a waveguide bundle. The waveguide bundle 610 includes multiple waveguides 605 arranged within an outer shell 612. The supporting feature includes a solid fill material 618 disposed within the outer shell between the waveguides and the outer shell. The solid fill material may be a dielectric material with a dielectric constant lower than the dielectric constant of the dielectric material of the waveguides. In certain embodiments, the solid fill material includes foam having a very low dielectric constant k (e.g., k~1.1). The solid fill material can fill the entire length or nearly the entire length of the outer shell 612 of the waveguide bundle 610.

FIG. 7 is an illustration of another embodiment of a waveguide bundle 710. The waveguide bundle 710 is similar to the waveguide bundle 410 of FIG. 4. However, in the waveguide bundle of FIG. 7, the supporting feature includes a solid fill material 718 arranged within a portion of an outer shell 712 that fills the space between the waveguides 705 and the outer shell in that portion of the outer shell. The remaining portion of the outer shell 712 includes a non-solid fill material 716. In certain embodiments, the solid fill material includes foam as shown in FIG. 6 and the non-solid fill material includes at least one of foam granules or foam powder as shown in FIGS. 5A and 5B.

The waveguide bundles of FIGS. 4, 5A, 5B, 6, and 7 have been described as including dielectric waveguides that do not have a conductive layer around the outer surface of the dielectric material to confine the electromagnetic waves to within the waveguide. However, the waveguide bundle structures described can be used with waveguides that include an outer layer of conductive material around a dielectric waveguide core. Embodiments in which the waveguides include a conductive layer do not need the outer shell (e.g., 412 of FIG. 4) to be conductive to provide the confinement of the electromagnetic waves. Thus, the outer shell of the waveguide bundle can made of non-conductive materials. The waveguides can be made to include a conductive outer layer as the waveguides are formed or assembled, or the conductive layer can be added after the waveguides are formed in the outer shell.

Figure 8A:
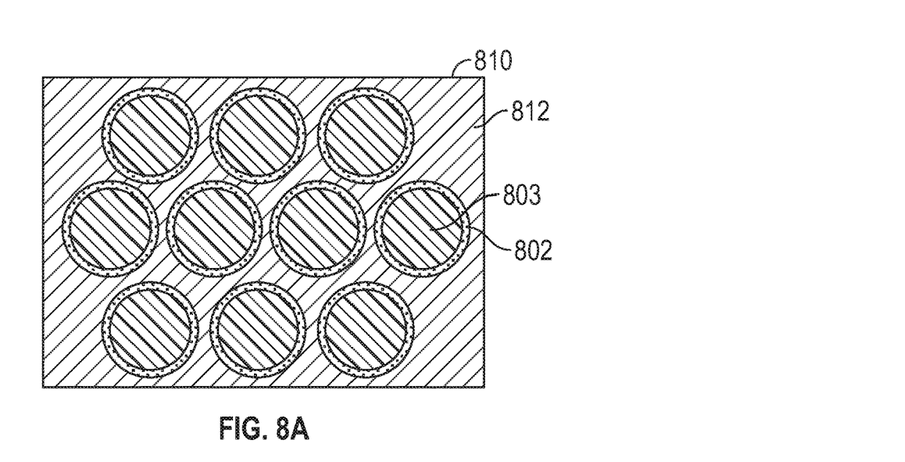
FIGS. 8A-8C are illustrations of more waveguide bundles in accordance with some embodiments.
Figure 8B:
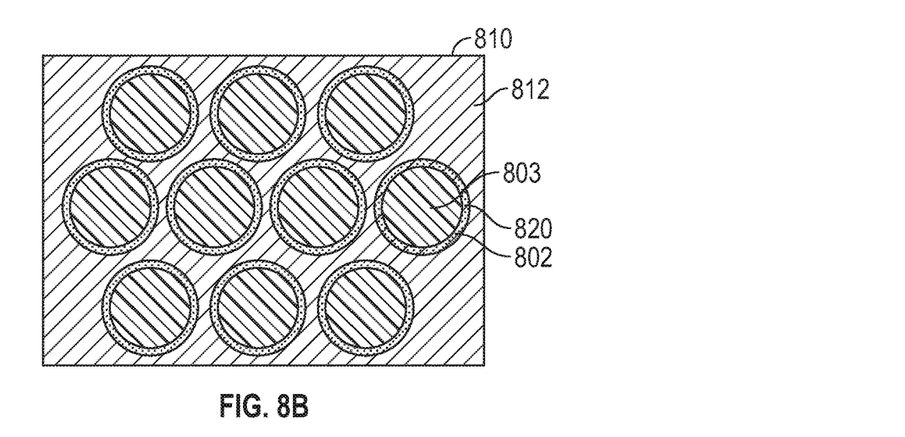
Figure 8C:
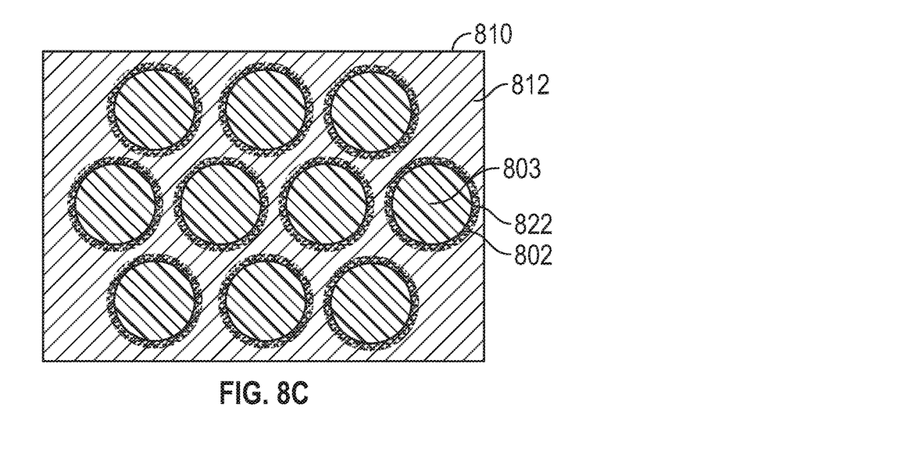

FIGS. 8A-8C are illustrations of additional embodiments of waveguide bundles. The waveguide bundles 810 include multiple waveguides embedded in flexible material 812. The flexible material can function as the supporting feature of the waveguide bundle and as the outer shell of the waveguide bundle. The waveguides include a dielectric waveguide core 803 and an outer layer 802. In FIG. 8A, the waveguides are embedded in a flexible matrix (e.g., of polydimethylsiloxane, or PDMS). The outer layer 802 can be a porous polymer shell, or can be a removable shell. To form a porous polymer shell, the outer layer can include a porogen filled material.

As shown in FIG. 8B, heating of the flexible outer shell and the porogen filled material can then create pores 820 or regions void of the flexible material (e.g., air-filled) between the flexible material and the outer layer of the waveguides. To form a removable shell, the outer layer 802 can include a removable layer. Heating or etching can remove all or portions of the removable layer to produce an outer layer that is void of the flexible material and composed mostly of air. As shown in FIG. 8C, the outer layers of the waveguides can be metalized after the void regions are formed. If the pores or void regions are large enough, the metallization can be formed using chemical vapor deposition. Alternatively, the outer layer 802 can include a metal catalyst and electroplating can be used to metalize the outer surface 822 of the embedded waveguides. Waveguide transceiver circuits and antennas (waveguide launchers) can be operatively coupled to the waveguides that are embedded in the flexible material. Because the waveguides include a conductive outer layer, it is not important to maintain a specific minimum separation distance between the waveguides.

Figure 9:
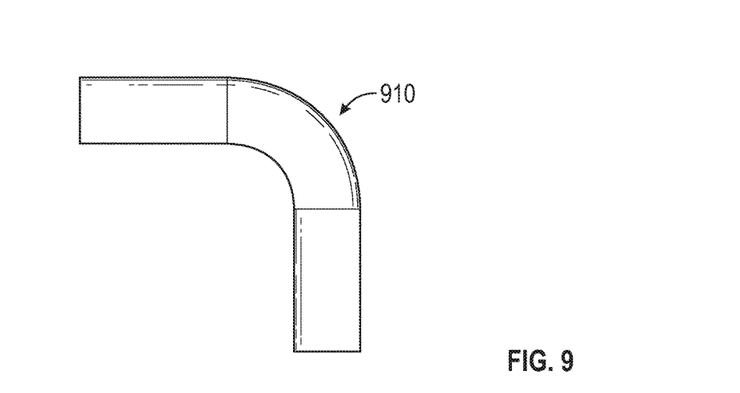
FIG. 9 is another illustration of portions of another waveguide bundle in accordance with some embodiments.

Implementing the interconnections of server units using waveguide bundles may require waveguide bundles with one or more bends in the waveguide bundles. FIG. 9 is an illustration of the outer shell of a waveguide bundle 910 that includes a bend or a turn. Separate waveguide bundles that include a bend can be connected to straight bundle sections. The waveguide bundle sections with different shapes can be either fully filled with a fill material (e.g., a dielectric foam) or can include only a supporting feature to maintain the specified distance between the waveguides in the waveguide bundle. The sections that include a bend may allow sliding of the waveguides within the waveguide bundle to provide strain relief and maintain the shape of the waveguide cross sections.

A waveguide bundle section can include a joining feature on at least one of the ends of the waveguide bundle section for joining to a second separate waveguide bundle section. In certain embodiments, the waveguide bundle section can include a plug connector of a plug-receptacle connector pair, and the second waveguide bundle section can include the receptacle connector. The waveguides of the waveguide bundle may also include joining features. In some embodiments, the waveguide bundle sections can have an "L" shape or a "T" shape for connecting to straight waveguide bundle sections. In certain embodiments, a waveguide bundle section can include a turn or bend with an angle less than ninety degrees (90°). In certain embodiments, a waveguide bundle section can include a turn or bend with an angle greater than 90'.

Figure 10:
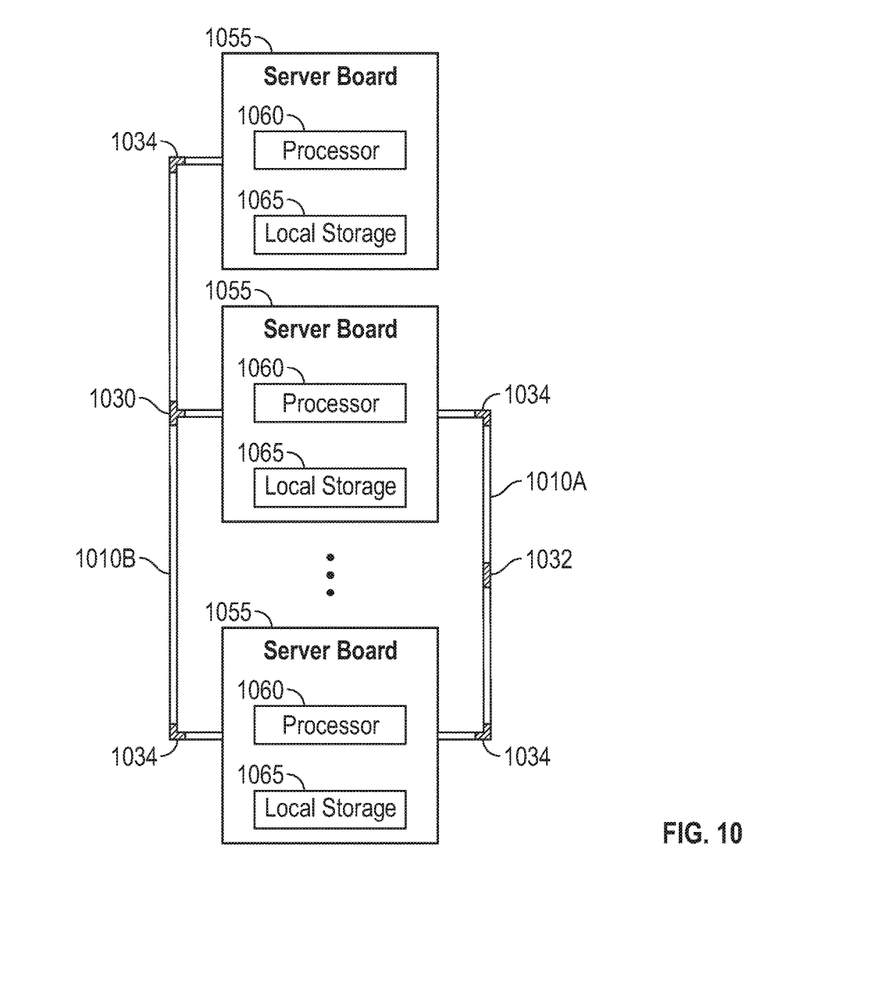
FIG. 10 is a block diagram of an electronic system in accordance with some embodiments.

FIG. 10 is a block diagram of an electronic system 1000 incorporating waveguide bundle assemblies in accordance with at least one embodiment of the invention. Electronic system 1000 is merely one example in which embodiments of the present invention can be used. The electronic system 1000 of FIG. 10 comprises multiple servers or server boards 1055 interconnected as a server cluster that may provide Internet cloud services. A server board 1055 may include one or more processors 1060 and local storage 1065. Only three server boards are shown to simplify the example in FIG. 10. A server cluster may include hundreds of server units arranged on boards or server blades in a rack of servers, and a server cluster can include dozens of racks of server blades. Racks can be placed side-by-side with a back-plane or back-panel used to interconnect the racks. Server switching devices can be included in the racks of the server cluster to facilitate switching among the hundreds of server units.

The server boards in FIG. 10 are shown interconnected using waveguide bundles 1010A and 1010B, although an actual system would include hundreds of rack-to-rack and within rack interconnections. The waveguides of the waveguide bundles can be dielectric only or can include a conductive layer arranged around a dielectric waveguide core. The waveguides bundles can include one or more "T" shaped sections 1030, "I" shaped sections 1032, and "L" shaped sections 1034. The waveguides are operatively connected to ports of the servers, such as by waveguide launchers for example. There can be multiple levels of interconnect between servers. These levels can include within server blade interconnect, within server rack interconnect, rack-to-rack interconnect and rack-to-switch interconnect. The waveguide bundles 1010A, 1010B are used for at least a portion of the interconnect within the server system, and can be used for any of the within server blade, within server rack, rack-to-rack, and rack-to-switch interconnections. In certain embodiments, the waveguide bundles form at least a portion of back-panel interconnections for a server cluster.

Figure 11:
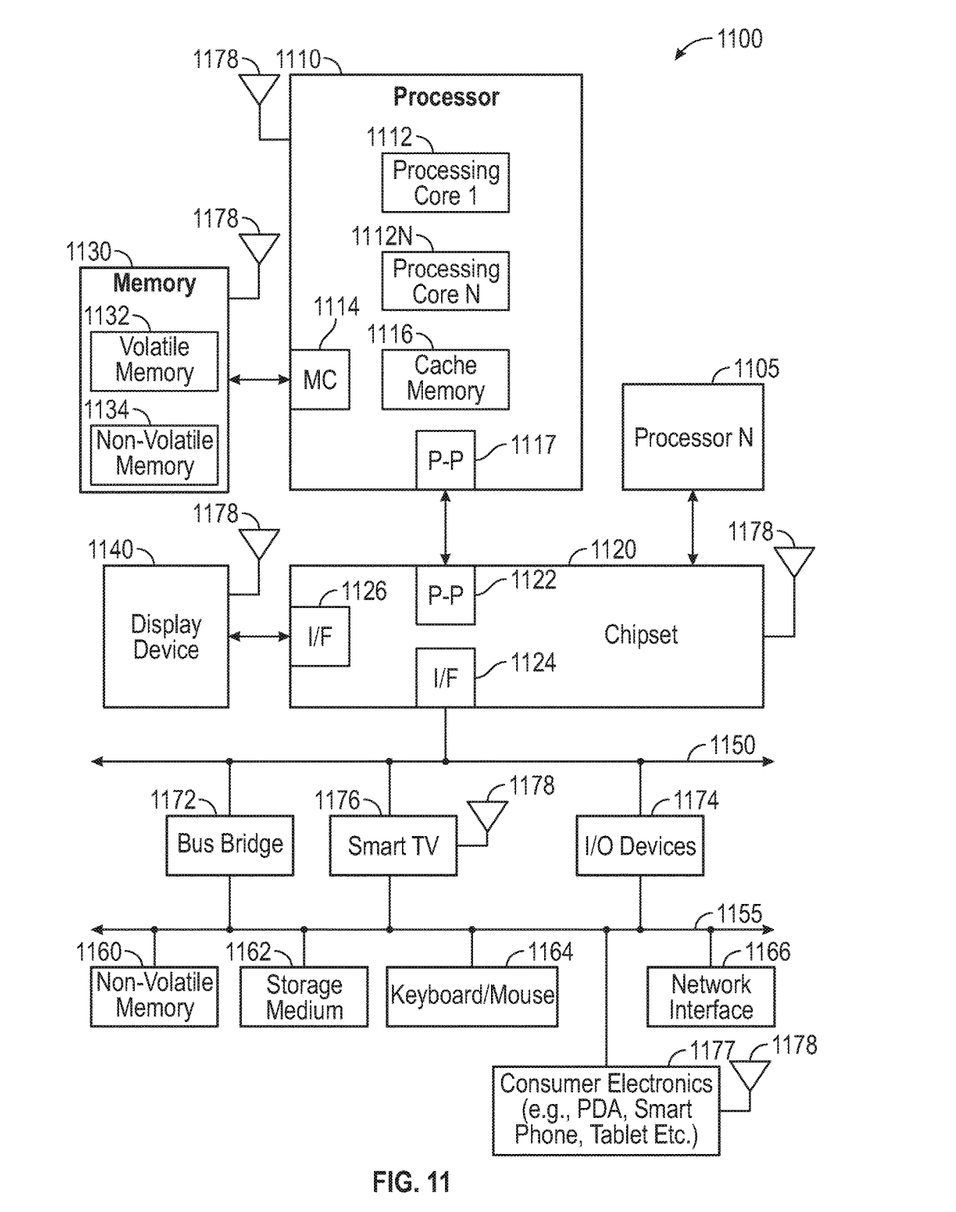
FIG. 11 is an illustration of another electronic system in accordance with some embodiments.

FIG. 11 illustrates a system level diagram, according to one embodiment of the invention. For instance, FIG. 11 depicts an example of an electronic device (e.g., system) that can include the waveguide interconnections as described in the present disclosure. In one embodiment, system 1100 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 1100 is a system on a chip (SOC) system. In one example, two or more systems as shown in FIG. 11 may be coupled together using one or more waveguides as described in the present disclosure. In one specific example, one or more waveguides as described in the present disclosure may implement one or more of busses 1150 and 1155.

In one embodiment, processor 1110 has one or more processing cores 1112 and 1112N, where N is a positive integer and where 1112 represents a first processor core and 1112N represents the Nth processor core inside processor 1110. In one embodiment, system 1100 includes multiple processors including 1110 and 1105, where processor 1105 has logic similar or identical to the logic of processor 1110.

In some embodiments, first processing core 1112 includes, but is not limited to, pre-fetch logic to fetch instructions, decode logic to decode the instructions, execution logic to execute instructions and the like. In some embodiments, processor 1110 has a cache memory 1116 to cache instructions and/or data for system 1100. Cache memory 1116 may be organized into a hierarchal structure including one or more levels of cache memory.

In some embodiments, processor 1110 includes a memory controller (MC) 1114, which is operable to perform functions that enable the processor 1110 to access and communicate with memory 1130 that includes a volatile memory 1132 and/or a non-volatile memory 1134. In some embodiments, processor 1110 is coupled with memory 1130 and chipset 1120. Processor 1110 may also be coupled to a wireless antenna interface 1178 to communicate with any device configured to transmit and/or receive wireless signals. In one embodiment, the wireless antenna interface 1178 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1132 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1134 includes, but is not limited to, flash memory, phase change memory (PCM), read-only memory (ROM), electrically erasable programmable read-only memory (EEPROM), or any other type of non-volatile memory device.

Memory 1130 stores information and instructions to be executed by processor 1110. In one embodiment, memory 1130 may also store temporary variables or other intermediate information while processor 1110 is executing instructions. In the illustrated embodiment, chipset 1120 connects with processor 1110 via Point-to-Point (PtP or P-P) interfaces 1117 and 1122. Chipset 1120 enables processor 1110 to connect to other elements in system 1100. In some embodiments of the invention, interfaces 1117 and 1122 operate in accordance with a PtP communication protocol such as the Intel® QuickPath Interconnect (QPI) or the like. In other embodiments, a different interconnect may be used.

In some embodiments, chipset 1120 is operable to communicate with processors 1110, 1105, display device 1140, and other devices 1172, 11.76, 1174, 1160, 1162, 1164, 1166, 1177, etc. Buses 1150 and 1155 may be interconnected together via a bus bridge 1172. Chipset 1120 connects to one or more buses 1150 and 1155 that interconnect various elements 1174, 1160, 1162, 1164, and 1166. Chipset 1120 may also be coupled to a wireless antenna interface 1178 to communicate with any device configured to transmit and/or receive wireless signals. Chipset 1120 connects to display device 1140 via interface (I/F) 1126. Display 1140 may be, for example, a liquid crystal display (LCD), a plasma display, cathode ray tube (CRT) display, or any other form of visual display device. In some embodiments of the invention, processor 1110 and chipset 1120 are merged into a single SOC. In one embodiment, chipset 1120 couples with a non-volatile memory 1160, a mass storage medium 1162, a keyboard/mouse 1164, and a network interface 1166 via interface (I/F) 1124 and/or 1126, I/O devices 1174, smart TV 1176, consumer electronics 1177 (e.g., PDA, Smart Phone, Tablet, etc.).

In one embodiment, mass storage medium 1162 includes, but is not limited to, a solid state drive, a hard disk drive, a universal serial bus flash memory drive, or any other form of computer data storage medium. In one embodiment, network interface 1166 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless antenna interface 1178 Operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 11 are depicted as separate blocks within the system 1100, the functions performed by some of these blocks may be integrated within a single semiconductor circuit or may be implemented using two or more separate integrated circuits. For example, although cache memory 1116 is depicted as a separate block within processor 1110, cache memory 1116 (or selected aspects of 1116) can be incorporated into processor core 1112.

Figure 12:
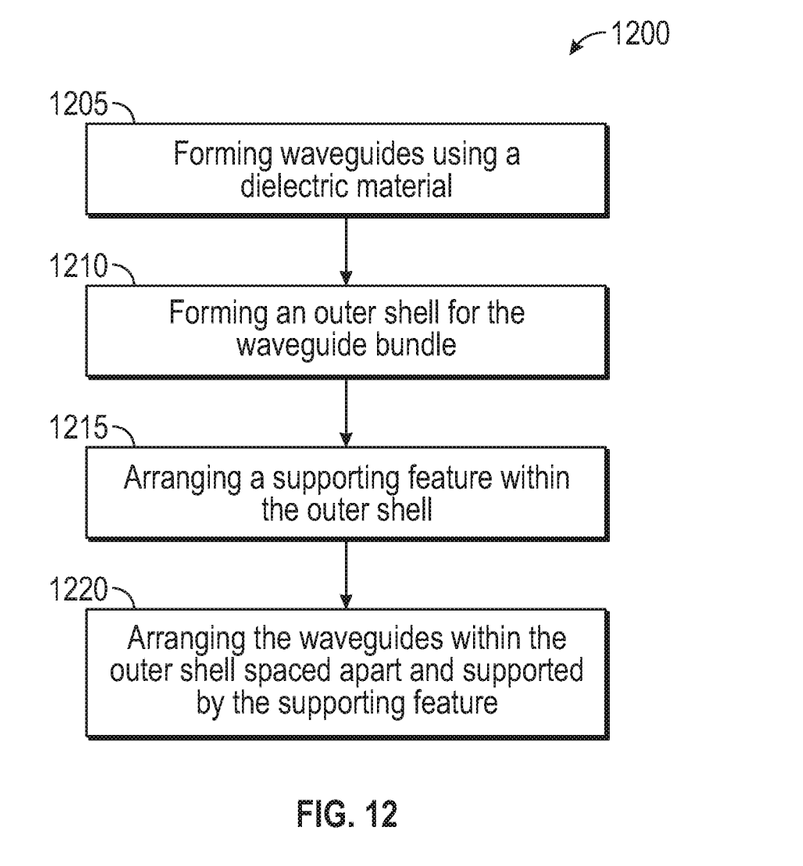
FIG. 12 is a flow diagram of an embodiment of making a waveguide in accordance with some embodiments.

FIG. 12 is a flow diagram of a method 1200 of making a waveguide bundle. At 1205 multiple waveguides are formed using a dielectric material. The waveguides may be solid tubes of dielectric material, or the waveguides may be hollow and include an airspace, or the waveguides may include one or more air spaces that are not located at the center of the waveguides.

At 1210, an outer shell is formed for the waveguide bundle. The outer shell may include an electrically conductive material to provide EMI protection for the waveguide bundle. In some embodiments, the waveguides include a conductive layer and the outer shell is not conductive. At 1215, a supporting feature is formed within the outer shell. The supporting feature can include one or more cross members joined to the outer shell as shown in the embodiments of FIGS. 4 and 5.

At 1220, the waveguides are supported and separate from each other within the outer shell by the supporting feature. The waveguides can be arranged in one layer to form a waveguide ribbon or can be arranged in multiple layers. In some embodiments, the supporting feature can include a solid fill material arranged within the outer shell as shown in the embodiments of FIGS. 6 and 7, and the waveguides can be arranged within the outer shell before or after the solid fill material is arranged within the outer shell. In some embodiments, the method 1200 includes arranging foam granules or foam powder within the outer shell.

Bundled waveguides together may provide easier handling and installation for complicated electronic systems that may have hundreds of point to point connections.

Additional Description and Examples

Example 1 can include subject matter (such as an apparatus) comprising: a plurality of waveguides, wherein the waveguides include a dielectric material; an outer shell; and a supporting feature within the outer shell, wherein the waveguides are arranged separate from each other within the outer shell by the supporting feature.

In Example 2, the subject matter of Example 1 optionally includes the supporting feature configured to maintain a specified separation distance between adjacent waveguides and positions the waveguides away from the outer shell.

In Example 3, the subject matter of one or both of Examples 1 and 2 optionally includes the supporting feature including one or more plastic cross members arranged along a length of the outer shell, and the plurality of waveguides are arranged within the one or more plastic cross members.

In Example 4, the subject matter of one or any combination of Examples 1-3 optionally includes a filling material separate from the supporting feature and arranged within the outer shell, wherein the filling material has a lower dielectric constant than the dielectric material of the waveguides.

In Example 5, the subject matter of Example 4 optionally includes filling material including at least one of am granules or foam powder.

In Example 6, the subject matter of Example 1 optionally includes the supporting feature including a solid fill material disposed within the outer shell between the waveguides and the outer shell.

In Example 7, the subject matter of Example 1 optionally includes the supporting feature including a solid fill material disposed within a portion of the outer shell and arranged to fill space in the portion between the waveguides and the outer shell, and wherein the remaining portion of the outer shell includes a non-solid fill material.

In Example 8, the subject matter of Example 7 optionally includes the solid fill material including foam and the non-solid fill material including at least one of foam granules or foam powder.

In Example 9, the subject matter of one or any combination of Examples 1-8 optionally includes the outer shell including a conductive material.

In Example 10, the subject matter of one or any combination of Examples 1-9 optionally includes the outer shell including a flexible material.

In Example 11, the subject matter of one or any combination of Examples 1-10 optionally includes a waveguide of the plurality of waveguides includes a waveguide core and an outer layer arranged around the waveguide core, wherein the waveguide core includes the dielectric material and the outer layer includes a conductive material, and wherein the outer shell includes a non-conductive material.

In Example 12, the subject matter of one or any combination of Examples 1-11 optionally includes the dielectric material of the waveguide core including at least one of polyethylene (PE), polytetrafluoroethylene (PTFE), perfluoroalkoxy alkalies (PEA), fluorinated ethylene propylene (FEP), polyvinylidene fluoride (PVDF), liquid crystal polymer (LCP), or ethylene-tetraflouroethylene (ETFE).

In Example 13, the subject matter of one or any combination of Examples 1-12 optionally includes waveguides that are one-half meter (0.5 m) in length or longer.

In Example 14, the subject matter of one or any combination of Examples 1-13 optionally includes electromagnetic wave launchers operatively coupled to the waveguides.

Example 15 can include subject matter (such as a system), or can optionally be combined with one or any combination of Examples 1-14 to include such subject matter, comprising a first server and a second server, wherein the first and second server units each include a plurality of ports; and a waveguide bundle connected to the ports of the first and second server units, wherein the waveguide bundle includes: a plurality of waveguides, wherein the waveguides include a dielectric material; an outer shell; and a supporting feature within the outer shell, wherein the waveguides are arranged separate from each other within the outer shell by the supporting feature.

In Example 16, the subject matter of Example 15 optionally includes the supporting feature configured to maintain uniform separation between adjacent waveguides of the plurality of waveguides and arrange the waveguides separate from the outer shell.

In Example 17, the subject matter of one or both of Examples 15 and 16 optionally includes the supporting feature including multiple plastic cross members arranged along a length of the outer shell, and the plurality of waveguides are arranged within the plastic cross members.

In Example 18, the subject matter of one or any combination of Examples 15-17 optionally includes the supporting feature including a solid material arranged within the outer shell and filling space between the waveguides and the outer shell.

In Example 19, the subject matter of one or any combination of Examples 15-18 optionally includes the supporting feature including a solid fill material arranged within a portion of the outer shell and filling space in the portion between the waveguides and the outer shell, and wherein the remaining portion of the outer shell includes a non-solid fill material.

Example 20 can include subject matter (such as an apparatus), or can optionally be combined with one or combination of Examples 1-19 to include such subject matter, comprising a plurality of waveguides, wherein the waveguides include a dielectric material; an outer shell, wherein the outer shell includes at least one of a bend or a turn; and a supporting feature within the outer shell, wherein the waveguides are arranged separate from each other within the outer shell by the supporting feature.

In Example 21, the subject matter of Example 20 optionally includes the supporting feature including multiple plastic cross members arranged along a length of the outer shell, and the plurality of waveguides are arranged within the plastic cross members.

In Example 22, the subject matter of Example 20 optionally includes optionally includes the supporting feature includes a solid material arranged within the outer shell and filling space between the waveguides and the outer shell.

In Example 23, the subject matter of Example 20 optionally includes the supporting feature includes a solid fill material arranged within a portion of the outer shell and filling space in the portion between the waveguides and the outer shell, and wherein the remaining portion of the outer shell includes a non-solid fill material.

In Example 24, the subject matter of one or any combination of Examples 20-23 optionally includes the outer shell including an "L" shape.

In Example 25, the subject matter of one or any combination of Examples 20-23 optionally includes the outer shell including a "T" shape.

These non-limiting examples can be combined in any permutation or combination.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus comprising:
a plurality of waveguides, wherein each of the waveguides include a respective dielectric material;
an outer shell;
a supporting feature within the outer shell, wherein the plurality of waveguides are arranged away from the outer shell and separate from each other within the outer shell by the supporting feature; and a filling material separate from the supporting feature and arranged within the outer shell, wherein the filling material has a lower dielectric constant than the dielectric material of the plurality of waveguides.

2. The apparatus of claim 1, wherein the supporting feature is configured to maintain a specified separation distance between adjacent ones of the plurality of waveguides.

3. The apparatus of claim 1, wherein the supporting feature includes one or more plastic cross members arranged along a length of the outer shell, and the plurality of waveguides are arranged within the one or more plastic cross members.

4. The apparatus of claim 1, including electromagnetic wave launchers operatively coupled to the plurality of waveguides.

5. The apparatus of claim 1, wherein the filling material includes at least one of foam granules or foam powder.

6. The apparatus of claim 1, wherein the supporting feature includes a solid fill material disposed within the outer shell between the plurality of waveguides and the outer shell.

7. The apparatus of claim 1, wherein the supporting feature includes a solid fill material disposed within a portion of the outer shell and arranged to fill space in the portion between the plurality of waveguides and the outer shell, and wherein the remaining portion of the outer shell includes a non-solid fill material as the filling medium.

8. The apparatus of claim 7, wherein the solid fill material includes foam and the non-solid fill material includes at least one of foam granules or foam powder.

9. The apparatus of claim 1, wherein the outer shell includes a conductive material.

10. The apparatus of claim 1, wherein the outer shell includes a flexible material.

11. The apparatus of claim 1, wherein each waveguide of the plurality of waveguides includes a respective waveguide core and a corresponding outer layer arranged around the respective waveguide core, wherein the respective waveguide core includes the corresponding dielectric material and the respective outer layer includes a conductive material, and wherein the outer shell includes a non-conductive material.

12. The apparatus of claim 1, wherein the dielectric material of the respective waveguide core includes at least one of polyethylene (PE), polytetrafluoroethylene (PTFE), perfluoroalkoxy alkanes (PEA), fluorinated ethylene propylene (FEP), polyvinylidene fluoride (PVDF), liquid crystal polymer (LCP), or ethylene-tetraflouroethylene (ETFE).

13. The apparatus of claim 1, wherein the plurality of waveguides are one-half meter (0.5 m) in length or longer.

14. An apparatus comprising:
a first server board and a second server board, wherein the first and second server boards each include a plurality of ports; and a waveguide bundle connected to the ports of the first and second server boards, wherein the waveguide bundle includes:
a plurality of waveguides, wherein each of the waveguides include a respective dielectric material;
an outer shell; and
a supporting feature within the outer shell, wherein the plurality of waveguides are arranged away from the outer shell and separate from each other within the outer shell by the supporting feature, wherein the supporting feature includes multiple plastic cross members arranged along a length of the outer shell, and the plurality of waveguides are arranged within the plastic cross members.

15. The apparatus of claim 14, wherein the supporting feature includes a solid fill material arranged within a portion of the outer shell and filling space in the portion between the plurality of waveguides and the outer shell, and wherein the remaining portion of the outer shell includes a non-solid fill material.

16. The apparatus of claim 14, wherein the supporting feature is configured to maintain uniform separation between adjacent ones of the plurality of waveguides of the plurality of waveguides.

17. The apparatus of claim 14, wherein the supporting feature includes a solid material arranged within the outer shell and filling space between the plurality of waveguides and the outer shell.

18. An apparatus comprises:
a plurality of waveguides, wherein each of the waveguides includes a respective dielectric material;
an outer shell, wherein the outer shell includes at least one of a bend or a turn; and
a supporting feature within the outer shell, wherein the plurality of waveguides are arranged away from the outer shell and separate from each other within the outer shell by the supporting feature, wherein the supporting feature includes multiple plastic cross members arranged along a length of the outer shell, and the plurality of waveguides are arranged within the plastic cross members.

19. The apparatus of claim 18, wherein the outer shell includes a "T" shape.

20. The apparatus of claim 18, wherein the outer shell includes an "L" shape.

21. The apparatus of claim 18, wherein the supporting feature includes a solid fill material arranged within a portion of the outer shell and filling space in the portion between the plurality of waveguides and the outer shell, and wherein the remaining portion of the outer shell includes a non-solid fill material.

22. The apparatus of claim 18, wherein the supporting feature includes a solid material arranged within the outer shell and filling space between the plurality of waveguides and the outer shell.

* * * * *

UNITED STATES PATENT AND TRADEMARK OFFICE
CERTIFICATE OF CORRECTION

PATENT NO. : 10,249,925 B2
APPLICATION NO. : 15/282086
DATED : April 2, 2019
INVENTOR(S) : Dogiamis et al.

Page 1 of 1

It is certified that error appears in the above-identified patent and that said Letters Patent is hereby corrected as shown below:

In the Claims

In Column 11, Line 46, in Claim 12, delete "claim 1," and insert --claim 11,-- therefor In Column 11, Line 49, in Claim 12, delete "(PEA)," and insert --(PFA),-- therefor Signed and Sealed this
Twenty-eighth Day of April, 2020

Andrei Iancu
*Director of the United States Patent and Trademark Office*